United States Patent
Carlsson

(10) Patent No.: US 6,607,196 B2
(45) Date of Patent: Aug. 19, 2003

(54) SEALING WASHER

(75) Inventor: Ulf Carlsson, Stockholm (SE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/245,263

(22) Filed: Feb. 5, 1999

(65) Prior Publication Data

US 2002/0140173 A1 Oct. 3, 2002

(30) Foreign Application Priority Data

Mar. 27, 1998 (SE) .............................. 9801039

(51) Int. Cl.$^7$ .......................... F16J 15/32; F16C 33/74; B01F 7/00
(52) U.S. Cl. ................. 277/353; 277/500; 277/549; 384/140; 366/314; 366/331
(58) Field of Search ............... 277/353, 549, 277/551, 402, 565, 562, 500; 384/482, 140; 366/331, 314, 205

(56) References Cited

U.S. PATENT DOCUMENTS

| | | | | |
|---|---|---|---|---|
| 2,873,153 A | * | 2/1959 | Haynie | 308/187.2 |
| 3,245,735 A | * | 4/1966 | Sikora | 308/187.1 |
| 3,519,316 A | * | 7/1970 | Gothberg | 308/187.2 |
| 3,601,411 A | * | 8/1971 | Bourgeols | 277/82 |
| 3,715,147 A | * | 2/1973 | Zahn | 308/187.2 |
| 3,813,104 A | * | 5/1974 | Smith | 277/94 |
| 3,856,368 A | * | 12/1974 | Andersen | 308/187.2 |
| 4,043,620 A | * | 8/1977 | Otto | 308/187.2 |
| 4,283,063 A | * | 8/1981 | Prescott | 277/37 |
| 4,309,063 A | * | 1/1982 | Weis | 308/187.2 |
| 4,428,629 A | * | 1/1984 | Colanzi et al. | 384/144 |
| 5,044,782 A | * | 9/1991 | Jankowski | 384/482 |
| 5,383,728 A | * | 1/1995 | Micca et al. | 277/575 |
| 5,711,616 A | * | 1/1998 | Gassmann et al. | 384/482 |
| 5,820,258 A | * | 10/1998 | Braun | |
| 5,909,880 A | * | 6/1999 | Waskiewicz | 277/561 |
| 5,960,669 A | * | 10/1999 | Alaze | |
| 6,062,734 A | * | 3/2000 | Bundgrat | 384/477 |
| 6,152,846 A | * | 11/2000 | Schreier et al. | |
| 6,334,615 B1 | * | 1/2002 | Uchiyama et al. | |

* cited by examiner

Primary Examiner—Anthony Knight
Assistant Examiner—Vishal Patel
(74) Attorney, Agent, or Firm—Duane Morris LLP

(57) ABSTRACT

The invention concerns a device for sealing off a ring-formed opening between the rings in a ball bearing.

According to the invention the device is designed like a washer (9) comprising an outer flange (10) and an inwardly protruding waist (11), which ends with a contact surface (12) arranged to bear against the inner ring (5) of the ball bearing. The waist (11) will then cover the distance between the inner and outer rings of the ball bearing. The washer (9) is attached to and sealed against a surrounding bearing housing (7).

3 Claims, 3 Drawing Sheets

SEALING WASHER

FIELD OF THE INVENTION

The invention concerns a device for a submersible machine such as a pump or a mixer.

BACKGROUND OF THE INVENTION

Such a machine normally comprises an electrically driven motor and a hydraulic unit with an impeller connected to the motor via a rotary driving shaft.

In order to prevent the medium within the hydraulic unit from passing along the shaft and penetrating into the motor and causing damage, one or several seals are arranged between the hydraulic unit and the motor. A common type of seal is the so-called mechanical face seal, which comprises one seal ring rotating with the shaft and one stationary seal ring attached to the surrounding pump housing. The two seal rings are pressed towards each other by help of a spring and liquid is thus prevented from penetrating between the two seal surfaces.

If the medium within the hydraulic unit contains pollutants, these may pass between the seal surfaces as the pressure is higher in the hydraulic unit. The seal surfaces may then be damaged and the seal result is jeopardized.

It is therefore necessary to arrange two mechanical seals parted by a room filled with a barrier liquid which cools and lubricates the seal surfaces. In this way the seal close to the motor, called the inner seal, will always operate with a clean medium, thereby diminishing the risks for the seal surfaces being damaged. If the other seal close to the hydraulic unit, called the outer seal, should be damaged, the liquid within said hydraulic unit may penetrate into the barrier liquid room, but by checking the condition of the liquid in said room regularly, the seal can be repaired before any serious damage has occurred. An example of such a design is shown in Swedish Patent No 381 318.

The rotary driving shaft is supported by two bearings, the upper bearing and the lower bearing, the latter being located close to the previously mentioned seal. The bearing, normally a ball bearing, must be lubricated in order to operate satisfactory. It must also be protected from moisture to avoid corrosion of the surfaces of the rings and the balls. If the barrier liquid within the room between the two seals should penetrate through the upper seal, there is a risk that the leakage could destroy the lubrication film and cause a bearing break down.

In order to eliminate this problem it is common to arrange a drainage that expells the leakage from the area and also to provide some sort of protection in front of the bearing. Said protection shall cover the opening between the two bearing rings and prevent leakage from entering and simultanously prevent the grease in the bearing from slipping out. A known protection cover is the so-called NILOS ring. Said device is a ring of sheet metal locked to the outer ring of the bearing by help of a support ring and arranged to cover the opening mentioned. The support ring which is made of a rigid material is sealed relative the bearing housing by help of an O-ring.

A disadvantage with the above mentioned device is that it comprises several details which complicate and make the mounting work more expensive. In addition, there is always a risk that metal shavings may be emitted because of wear which shavings may penetrate into the bearing grease.

The purpose of the invention is thus to obtain a solution to the problem of protecting a bearing from penetrating liquid and particles therein by help of a device which is easy to mount and at the same time runs less risk to become damaged during operation. This is obtained by help of the device stated in the claims.

SUMMARY OF INVENTION

A sealing washer made of an elastic material for sealing off a ring-formed opening between an inner ring and an outer ring of a ball bearing, the inner ring being mounted on a driving shaft between an electric motor and a hydraulic unit and the outer ring being mounted in a bearing housing, the washer being arranged for preventing outer medium from penetrating into the bearing and simultaneously preventing bearing grease from slipping out of the bearing, the washer comprising a ring-formed body having an outer flange and an inwardly protruding waist for covering the distance between the two rings, the waist including a first contact surface at an inner end thereof, the first contact surface arranged for sliding along the inner ring of the bearing during operation and the outer flange including a second contact surface, wherein when the washer is mounted in the bearing housing, the second contact surface is located mainly radially outside of the outer ring and arranged to make contact with a shoulder on the bearing housing.

BRIEF DESCRIPTION OF THE DRAWING

The invention is described more closely below with reference to the enclosed drawings.

DETAILED DESCRIPTION OF THE INVENTION

Figure 1:
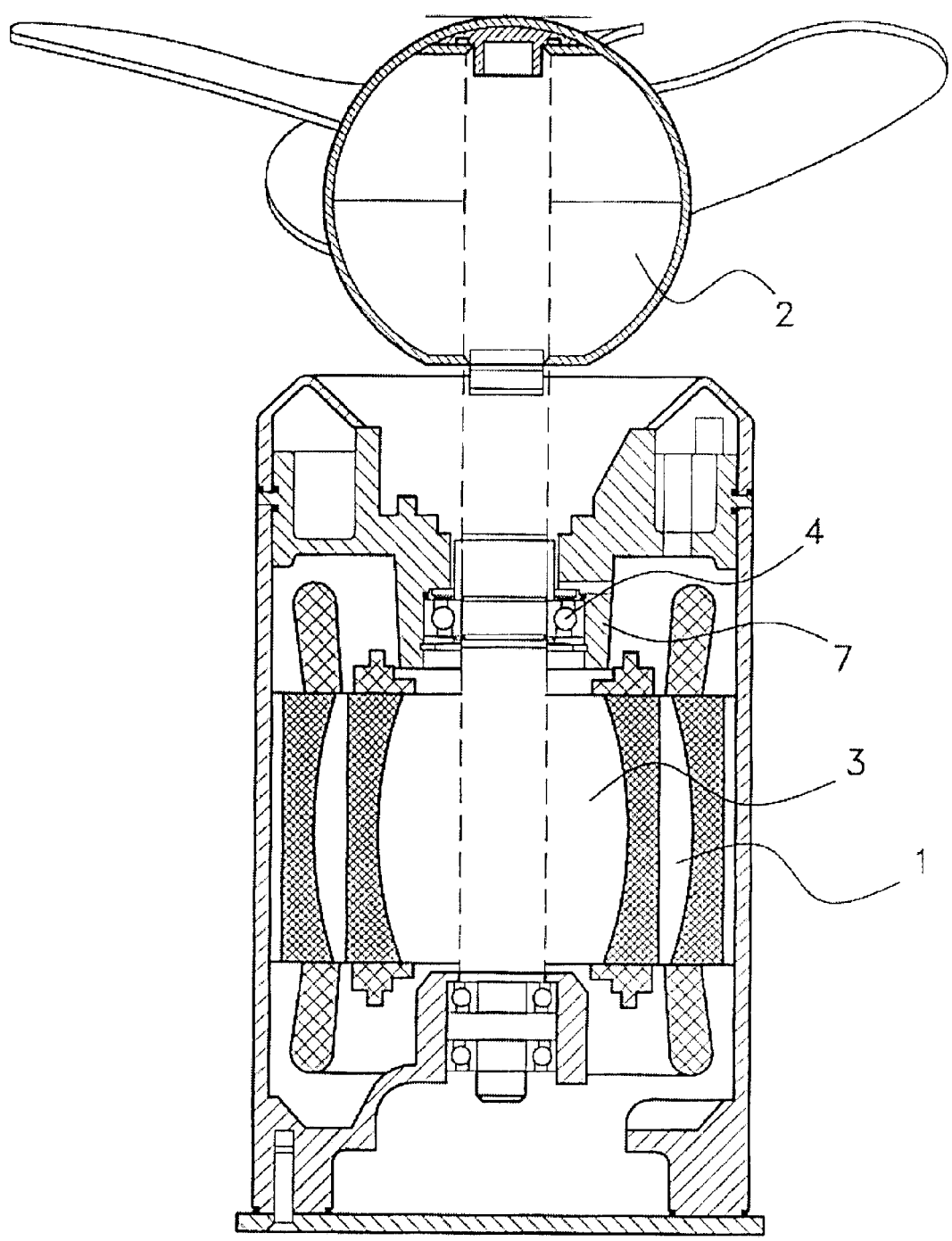
FIG. 1 shows a schematic view of a submersible machine, a mixer for liquids, provided with a device according to the invention.
Figure 2:
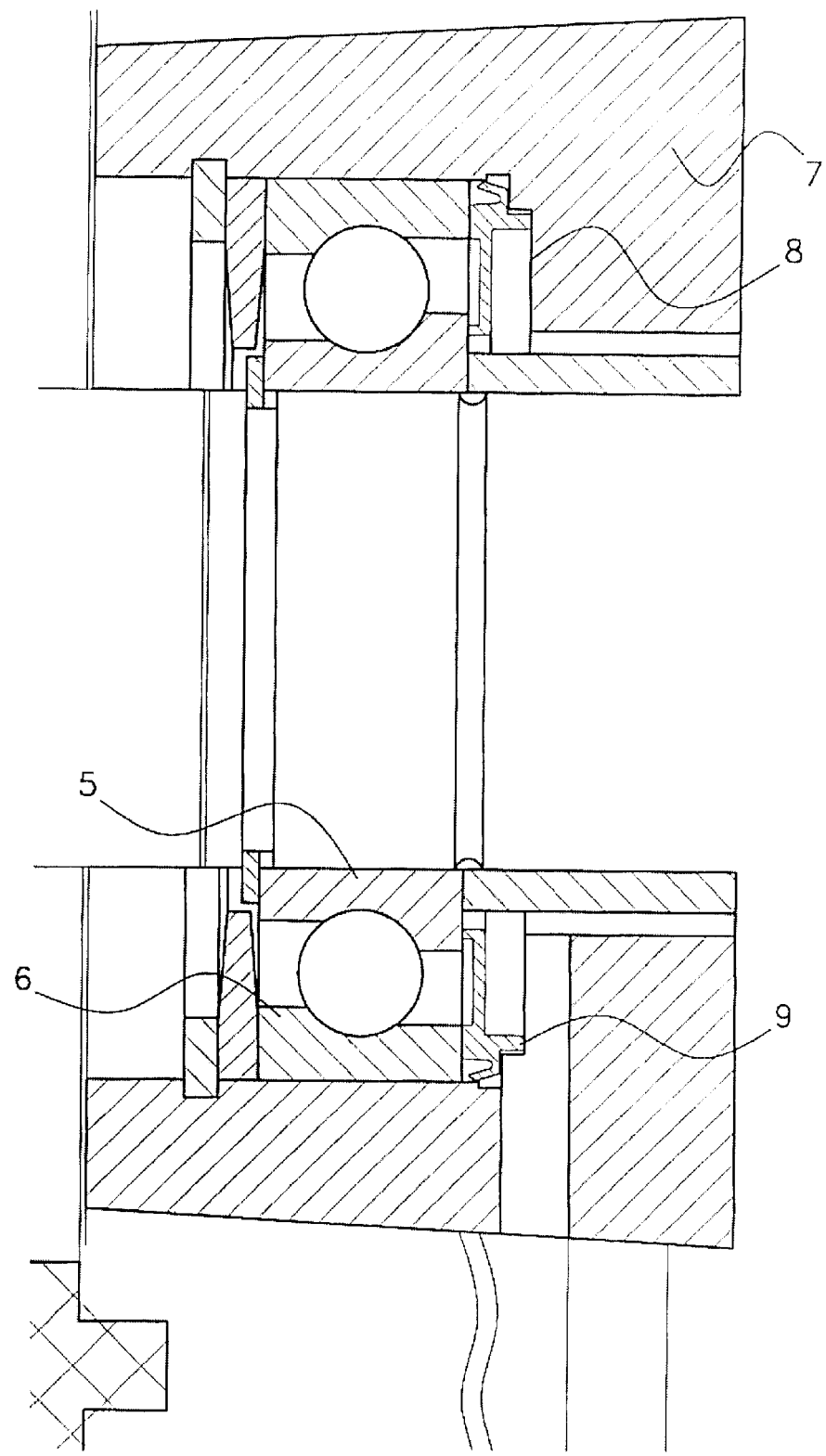
FIG. 2 shows a detail view.
Figure 3:
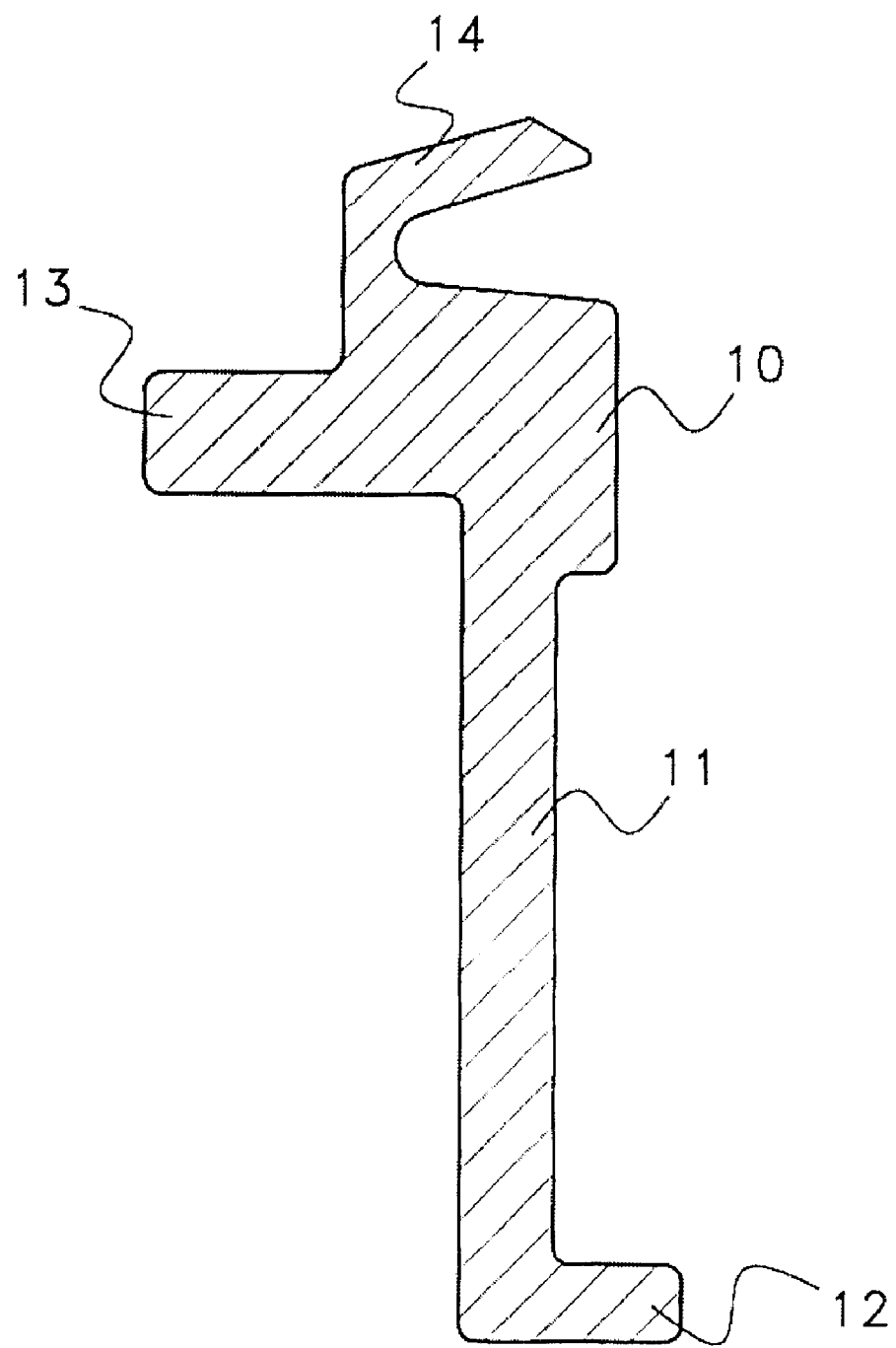
FIG. 3 a cut through a sealing washer according to the invention.

In the drawings 1 stands for an electric motor, 2 a propeller and 3 a driving shaft. 4 stands for a ball bearing having an inner ring 5 and an outer ring 6. 7 stands for a bearing housing with a shoulder 8. 9 stands generally for a sealing washer comprising a flange 10, a waist 11, contact surfaces 12 and 13 and a sealing lip 14.

In the specification below a submersible mixer is referred to. However, other types of machines such as pumps are also possible.

As previously mentioned, a submersible mixer comprises a motor 1, a hydraulic unit and an intermediate seal unit. The hudraulic unit comprises a propeller 2 driven by the motor via a shaft 3. Mechanical face seals, not shown, with an intermediate room for barrier liquid shall prevent the medium within the hydraulic unit from entering the motor along the shaft.

A certain leakage through the seals can never be avoided. Especially during continous operation, a small amount of the medium in the barrier liquid room will pass in the direction of the bearing. In order to prevent this liquid from entering the bearing, a drainage is arranged and in addition a seal washer 9 is located on the side of the bearing heading the seal. According to the invention, the seal washer is made of a resiliant material, such as plastic, and designed with a special cross section which solves the described problems in an advantageous way.

The ring formed seal washer 9 is designed with an outer flange 10 and a waist 11 protruding inwards from the flange and ending with a ring-formed surface 12 arranged to make contact with the inner ring 5 of the bearing. The waist 11 will then cover the opening between the inner ring 5 and the outer ring 6 of the bearing. The flange 10 is in addition provided with a ring-formed surface 13 arranged to make contact with a shoulder 8 on the bearing housing and also provided with a resilient lip 14 having a specific function.

The washer 9 is mounted in a circular room in the bearing housing 7, the inner diameter of which is somewhat smaller than the outer diameter of the washer including the lip 14. During the mounting procedure the lip 14 will then be bent inwardly, thus obtaining a good sealing against the bearing housing. When the washer has been mounted, the bearing 4 is entered onto the shaft 3 and moved until it reaches a resilient alignment with the washer, whereafter it is locked to the shaft in a suitable way.

By a suitable choice of design and material, one single detail, the washer 9, is able to replace three details which has been the solution up to now. An advantage, in addition to the shortened mounting time, is that the washer is made of a material, plastic, which is unable to damage the bearing grease.

What is claimed is:

1. A unitary, nonmetallic sealing washer for sealing off a ring-formed opening between an inner ring and outer ring of a ball bearing, the inner ring being mounted on a driving shaft between an electric motor and a hydraulic unit and the outer ring being mounted in a bearing housing, the washer being arranged for preventing outer medium from penetrating into the bearing and simultaneously preventing bearing grease from slipping out of the bearing, the washer comprising a ring-shape body of elastic material, the ring-shape body having an outer flange of a first thickness and an inwardly protruding waist of a second thickness which is less than the first thickness for covering the distance between the two rings, the waist including a first ring-shape member at an inner periphery thereof, the first ring-shape member defining a first radially extending contact surface, the first radially extending contact surface arranged for sliding along the inner ring of the bearing during operation and the outer flange including a second ring-shape member defining a second radically extending contact surface, wherein when the washer is mounted in the bearing housing, the second radially extending contact surface is located mainly radially outside of the outer ring and arranged to make contact with a shoulder on the bearing housing.

2. The sealing washer according to claim 1, wherein the washer includes a periphery having a resilient lip that is flexible in a radial direction, the lip for sealing off the washer relative to the surrounding bearing housing.

3. The sealing washer according to claim 2, wherein the periphery having the resilient lip is immediately adjacent to the outer flange.

* * * * *